(12) United States Patent
Hara (10) Patent No.: US 7,315,638 B2
(45) Date of Patent: Jan. 1, 2008

(54) IMAGE DISPLAY SYSTEM (75) Inventor: Shoji Hara, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 655 days.

(21) Appl. No.: 10/660,595

(22) Filed: Sep. 12, 2003

(65) Prior Publication Data
US 2004/0051710 A1 Mar. 18, 2004

(30) Foreign Application Priority Data
Sep. 13, 2002 (JP) .............................. 2002-268411

(51) Int. Cl.
G06K 9/00 (2006.01)
(52) U.S. Cl. ...................... 382/131; 382/128; 382/132; 382/154
(58) Field of Classification Search ................. 345/6, 345/419; 382/128, 131, 132, 154
See application file for complete search history.

(56) References Cited

U.S. PATENT DOCUMENTS 5,623,583 A * 4/1997 Nishino ....................... 345/420
6,961,911 B2 * 11/2005 Suzuki et al. ................. 715/858
6,980,690 B1 * 12/2005 Taylor et al. ................. 382/154
2002/0015006 A1 2/2002 Suzuki et al.

FOREIGN PATENT DOCUMENTS

| JP | 9-238934 A | 9/1997 |
| JP | 10-137236 A | 5/1998 |

* cited by examiner

Primary Examiner—Bhavesh M Mehta
Assistant Examiner—John B Strege
(74) Attorney, Agent, or Firm—Sughrue Mion, PLLC

(57) ABSTRACT

An arbitrary cross section of an object is designated and a depth perpendicular to the designated cross section is designated. A cross-section projected-image data representing a cross-section projected-image obtained by projecting, onto a plane parallel to the designated cross section, averages of the pixel values arranged in the directions of depth in the region defined by the designated cross section and the designated depth including the designated cross section is generated. Image processing conditions are set on the basis of analysis of the cross-section projected-image data, Image processing is carried out on the cross-section projected-image data on the basis of the image processing conditions and an image is displayed on the basis of the processed cross-section projected-image data.

23 Claims, 8 Drawing Sheets

IMAGE DISPLAY SYSTEM

BACKGROUND OF THE INVENTION

1. Field of the Invention

This invention relates to an image display system based on three-dimensional image data, and more particularly to an image display system which displays a tomogram along an arbitrary cross section.

2. Description of the Related Art

In order to observe the inside of an object, conventionally a plurality of tomograms are taken at predetermined intervals along an axis, for instance, by CT and are displayed. Recently, in order to display the inside of an object to be more understandable, there have been proposed a technology in which a plurality of pieces of image data (obtained, for instance, by CT) representing a plurality of cross sections are superimposed to obtain image data of a three-dimensional region of the object, and a tomogram of the object sectioned along a cross-section passing through a predetermined axis is displayed on the basis of the image data of the three-dimensional region of the object (see, for instance, U.S. Laid-Open No. 20020015006, or a technology in which a tomogram of the object sectioned along an arbitrary cross section (see, for instance, Japanese Unexamined Patent Publication No. 10(1998)-137236). Further, there has been proposed a technology in which a plurality of pieces of image data are subjected to weighted average processing and a weighted-average tomogram, in other words, "a tomogram provided with a depth" is displayed. (See, for instance, Japanese Unexamined Patent Publication No. 9(1997)-238934.)

According to these technologies, the user can easily grasp a three-dimensional image of the inside of an object since a tomogram along an arbitrary cross section of the object can be displayed and at the same time, the tomogram includes, as well as information on the designated cross section, information on cross sections before and behind the designated cross section.

In accordance with such a technology of displaying a tomogram having depth, the density information of the image to be displayed generally varies depending on the region to be displayed as an image. Accordingly, when the cross section and/or the depth of the tomogram to be displayed are changed, there is sometimes displayed a tomogram which is low in density and/or contrast and is hard to observe. Such a tomogram generally requires image processing in order to make it observable. Conventionally, the image processing has been manually carried out by the user. That is, each time the cross section and/or the depth of the tomogram to be displayed are changed and a tomogram hard to observe is displayed, it is necessary for the user to set image processing conditions and carry out image processing on the tomogram under the image processing conditions. However, these operations are troublesome for the user and make it infeasible to efficiently observe tomograms.

SUMMARY OF THE INVENTION

In view of the foregoing observations and description, the primary object of the present invention is to provide an image display system which does not require the user's troublesome operation for image processing and makes it feasible to efficiently observe tomograms of an object.

In accordance with a first aspect of the present invention, there is provided an image display system comprising an image data obtaining means which obtains image data consisting of three-dimensional pixel values representing an object, a cross section designating means for designating an arbitrary cross section of the object, a depth designating means for designating a depth perpendicular to the designated cross section, a cross-section projected-image data generating means which generates, on the basis of the image data, cross-section projected-image data representing a cross-section projected-image obtained by projecting, onto a plane parallel to the designated cross section, averages of the pixel values arranged in the directions of depth in the region defined by the designated cross section and the designated depth including the designated cross section, an image processing condition setting means which sets image processing conditions on the basis of the designated depth, an image processing means which carries out image processing on the cross-section projected-image data on the basis of the image processing conditions set by the image processing condition setting means, and a display means which displays an image on the basis of the cross-section projected-image data processed by the image processing means.

In accordance with a second aspect of the present invention, there is provided an image display system comprising an image data obtaining means which obtains image data consisting of three-dimensional pixel values representing an object, a cross section designating means for designating an arbitrary cross section of the object, a depth designating means for designating a depth perpendicular to the designated cross section, a cross-section projected-image data generating means which generates, on the basis of the image data, cross-section projected-image data representing a cross-section projected-image obtained by projecting, onto a plane parallel to the designated cross section, averages of the pixel values arranged in the directions of depth in the region defined by the designated cross section and the designated depth including the designated cross section, an image processing condition setting means which sets image processing conditions on the basis of analysis of the cross-section projected-image data, an image processing means which carries out image processing on the cross-section projected-image data on the basis of the image processing conditions set by the image processing condition setting means, and a display means which displays an image on the basis of the cross-section projected-image data processed by the image processing means.

The image display system in accordance with the second aspect of the present invention differs from that in accordance with the first aspect of the present invention in that the image processing conditions are set on the basis of the designated depth in the image display system in accordance with the first aspect of the present invention whereas the image processing conditions are set on the basis of analysis of the cross-section projected-image data in the image display system in accordance with the second aspect of the present invention.

The term "image data consisting of three-dimensional pixel values representing an object" as used here means data expressing the internal structure of an object by values of a plurality of three-dimensionally arranged pixels, and may be, for instance, three-dimensional data obtained by superimposing a plurality of two-dimensionally arranged pixel values representing a plurality of tomograms taken at predetermined intervals along an axis, for instance, by CT, along the axis.

The term "the region defined by the designated cross section and the designated depth including the designated cross section" as used here means a region which is between a pair of planes apart from each other at a distance of the designated depth in parallel to the designated cross-section and includes the designated cross section.

Further, the "image processing" may include, for instance, gradation processing for adjusting the density level and/or the contrast of the image or frequency processing for enhancing components in a particular frequency band.

Further, the "analysis of the cross-section projected-image data" as used here means, for instance, a histogram analysis carried out on pixel values of the cross-section projected-image data.

The "depth designating means" may be one which can designate an arbitrary depth or one which selects one of options.

In the image display system in accordance with the first aspect of the present invention, the image processing condition setting means may set the image processing conditions on the basis of the designated depth either by reading out image processing conditions prepared in advance by the value of the designated depth, or by calculating the image processing conditions on the basis of each designated depth.

In the image display system of the present invention (in accordance with the first and second aspects of the present invention), the image processing condition setting means may set the image processing conditions either according to the kind of the object represented by the image data or according to the purpose of observation of the cross-section projected-image.

The "image data obtaining means" may obtain the image data either by reading out the image data from a storage means provided in the image display system of the present invention or by reading out the image data from a CT, an image server or the like connected to the image display system of the present invention by way of, for instance, a network.

The "image data" may be three-dimensional CT data.

Further, the "image data" may be image data representing a medical image obtained by taking an affected part of an organism such as a human or an animal.

In the image display system of the present invention, since the image processing conditions are set in response to change of the cross section and/or the depth, troublesome operations by the user including setting of the image processing conditions and image processing become unnecessary, whereby efficient observation of images can be realized.

When the image processing conditions are set according to the kind of the object represented by the image data, the image processing conditions can be set according to the feature in density by the kind of the object, whereby more observable image can be displayed.

Further when the image processing conditions are set according to the purpose of observation, the image processing conditions can be set to be suitable for the purpose of observation, whereby more observable image can be displayed.

DESCRIPTION OF THE PREFERRED EMBODIMENT

Figure 1:
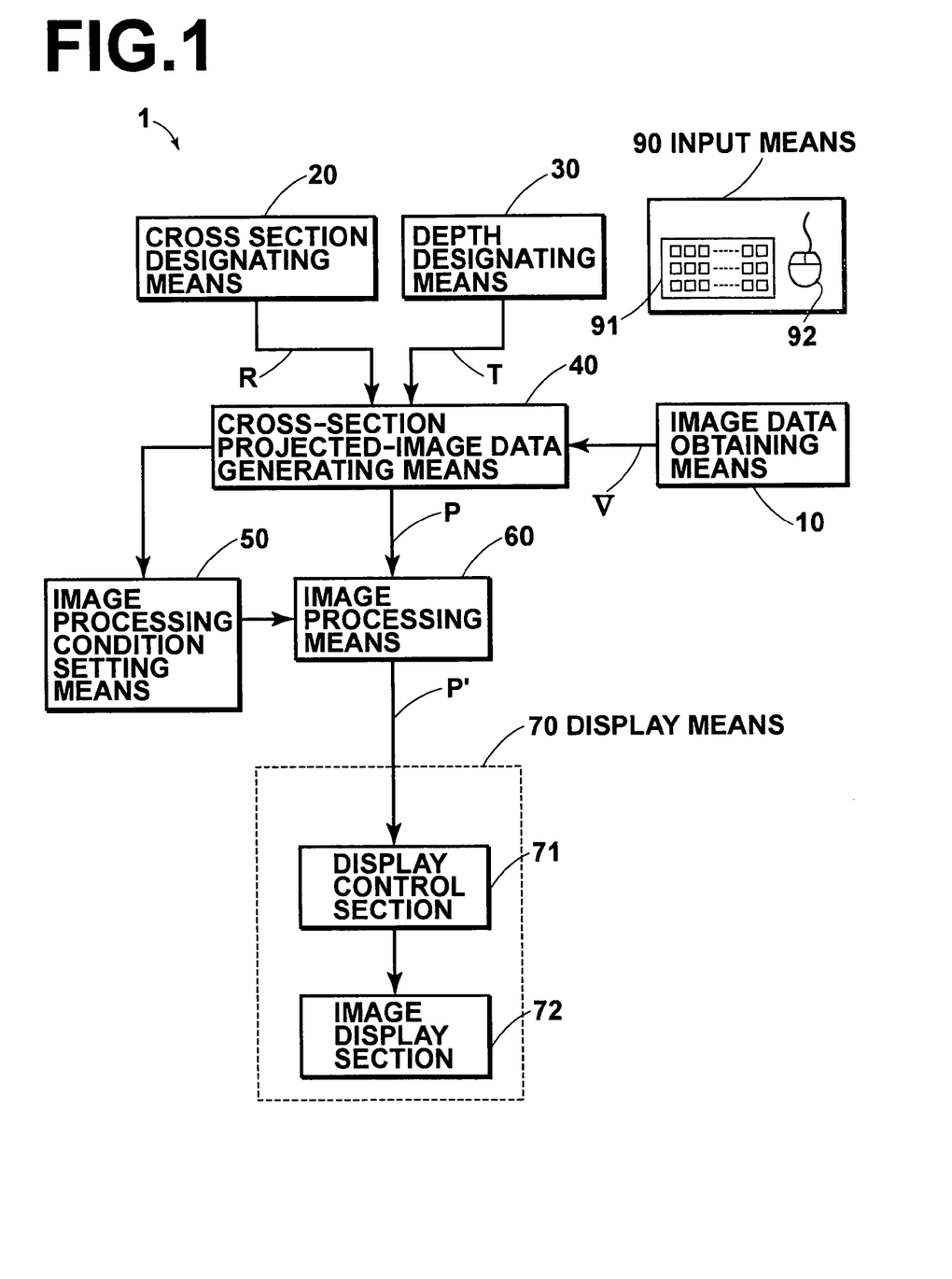
FIG. 1 is a schematic block diagram showing an image display system in accordance with an embodiment of the present invention.
Figure 2:
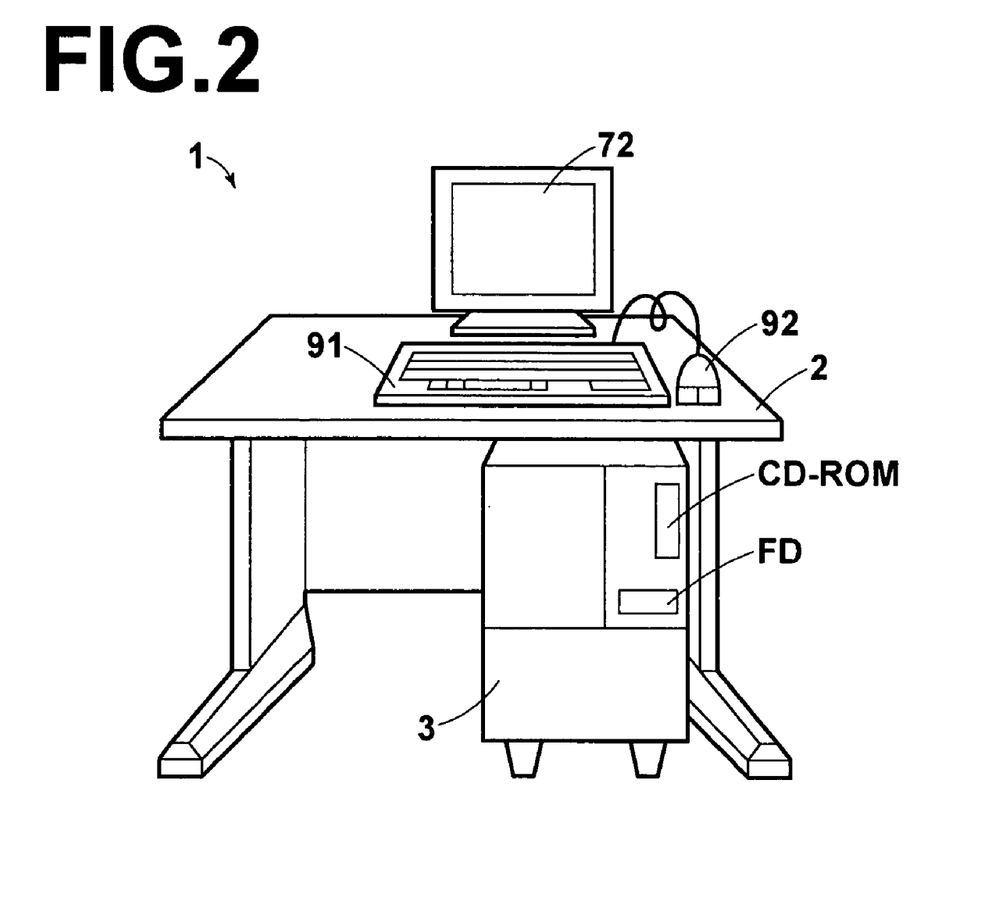
FIG. 2 is a perspective view showing an appearance of the image display system.

In FIGS. 1 and 2, an image display system 1 in accordance with an embodiment of the present invention comprises an image data obtaining means 10 which obtains image data V consisting of three-dimensional pixel values representing an object, a cross section designating means 20 for designating an arbitrary cross section R of the object, a depth designating means 30 for designating a depth T perpendicular to the designated cross section R, a cross-section projected-image data generating means 40 which generates, on the basis of the image data V, cross-section projected-image data P representing a cross-section projected-image P (an image and image data representing the image will be denoted by the same symbol for the purpose of simplicity) obtained by projecting, onto a plane parallel to the designated cross section R, averages of the pixel values arranged in the directions of depth in the region defined by the designated cross section R and the designated depth T including the designated cross section R, an image processing condition setting means 50 which sets image processing conditions on the basis of analysis of the cross-section projected-image data, an image processing means 60 which obtains processed cross-section projected-image data P' by carrying out image processing on the cross-section projected-image data P on the basis of the image processing conditions set by the image processing condition setting means 50, and a display means 70 which displays an image on the basis of the processed cross-section projected-image data P'.

The image processing means 70 comprises a display control section 71 which converts the processed cross-section projected-image data P' into an image signal for display and causes an image display section 72 to display an image on the basis of the image signal. The image display section 72 may comprise, for instance, a CRT panel or a liquid crystal panel.

The image display system 1 further comprises an input means 90 comprising a keyboard 91, a mouse 92 and the like for inputting data for designating a cross section R and the depth T, and for various controls.

As shown in FIG. 2, the image display section 72 and the input means 90 are disposed on a table 2 whereas the image data obtaining means 10, the cross-section projected-image data generating means 40 and the like are built in a body 3 disposed below the table 2.

The image data obtaining means 10 comprises, for instance, a magnetic recording system such as a hard disc which reads out image data V from a computer-readable portable recording medium such as a CD-ROM or an MO (magneto optical disc) or from a CT connected to the image display system 1 by way of a network or the like and stores the image data V.

The cross section designating means 20 is for designating a cross section R of the object and the depth designating means 30 is for designating a depth T including the designated cross section R. The region defined by the designated cross section R and the designated depth T is displayed as the cross-section projected-image P. Only one cross section R may be designated or a plurality of cross sections R arranged at predetermined intervals along an axis may be designated. Designation of the cross section R and the depth T may be effected either by displaying an image representing the object on the screen of the image display section 72 and pointing points which particularize a cross section R on the image with the keyboard 91 and/or the mouse 92, or by displaying an image which is a model of a cross section R and determining a desired position of a cross section R by three-dimensionally moving or rotating the image along or about an axis, or by directly inputting values of coordinates representing points which particularize a cross section R or values representing a depth T.

The cross-section projected-image data generating means 40 averages values of pixels in the region defined by the designated cross section R and the designated depth T including the designated cross section R in the direction of depth and projects the averages of the pixel values onto a plane parallel to the designated cross section R, thereby generating two-dimensional cross-section projected-image data P representing the cross-section projected-image P. The cross-section projected-image data generating means 40 generates cross-section projected-image data P not only for the region defined by the designated cross section R and the designated depth T including the designated cross section R but also for regions defined by cross sections and depths which are preset or selectable from those in predetermined ranges. For example, when the image display system is started, the cross-section projected-image data generating means 40 sometimes generates cross-section projected-image data P for a region particularized in accordance with preset initial conditions and sometimes generates cross-section projected-image data P for a region particularized by designating cross sections perpendicular to a predetermined axis. When the designated depth T is substantially equal to the thickness of the object, the cross-section projected-image data P reflects averages of the values of substantially all the pixels inside the object and accordingly, the image represented by the cross-section projected-image data P is substantially the same as an ordinary radiation image. That is, by selecting the depth T, the cross-section projected-image P can be displayed in a form suitable for the intended application.

The image processing condition setting means 50 sets the image processing conditions on the basis of analysis of the cross-section projected-image data P, and the image processing means 60 obtains processed cross-section projected-image data P' by carrying out image processing such as gradation processing or frequency processing on the cross-section projected-image data P on the basis of the image processing conditions set by the image processing condition setting means 50.

Depending on the region of the object to be displayed as the cross-section projected-image P, various pieces of density information are included in the image, which makes the image unobservable. However, when the image processing conditions are set on the basis of analysis of the cross-section projected-image data P and image processing is carried out on the cross-section projected-image data P on the basis of the image processing conditions thus set, such a cross-section projected-image P can be converted to a more observable image. Especially, when the depth T is set to be relatively large, the image tends to be an image in which the density changes relatively gently due to averaging of the pixel values. In such a case, in order to make the image more observable, frequency processing in which frequency components are differently weighted so that edges of the image are enhanced may be carried out on the cross-section projected-image data P. The analysis of the cross-section projected-image data P may be, for instance, a histogram analysis of pixel values.

As the method of setting the gradation processing conditions, there has been well known a method in which to which ranges of pixel values the full scale of the gradation level representing the density of the image is to be applied is set on the basis of the window value WC (the center value of the range of the pixel values) and the window width WW (the width of the range of the pixel values), and in this embodiment, the gradation processing conditions are set in this method.

The display control section 71 sets the layout of the screen of the image display section 72 so that a cross-sectional image display area in which one or more cross-section projected-image is displayed and a control panel display area in which a control panel for various settings are set side by side. Further, the display control section 71 can switch the view mode between two different view modes. One view mode is "Tile View" mode in which a plurality of continuous cross-section projected-images taken along cross sections at predetermined intervals along an axis are displayed at one time side by side. The other view mode is "Mpr View" mode in which three cross-section projected-images respectively taken along cross sections perpendicular to three predetermined axes which are perpendicular to each other and a cross-section projected-image taken along a cross designated section are displayed at one time side by side. The Tile View mode and the Mpr View mode are switched in response to a control of the user. The three predetermined axes which are perpendicular to each other are A axis extending in the vertical direction of the object, C (coronal) axis extending forward of the object, and S (sagittal) axis extending in the transverse direction of the object.

Operation of the image display system of this embodiment will be described hereinbelow.

In this embodiment, it is assumed that the image data V is three-dimensional data obtained by superimposing a plurality of pieces of image data taken by a CT in the direction of axis of slice, and the three-dimensional image data V has been input into the image data obtaining means 10 and has been stored therein.

When the image display system 1 of this embodiment is started, the display control section 71 causes the image display section 72 to display in predetermined one of the Tile View mode and the Mpr View mode. In this embodiment, the display control section 71 causes the image display section 72 to display in the Tile View mode upon start-up of the image display system 1.

Figure 3:
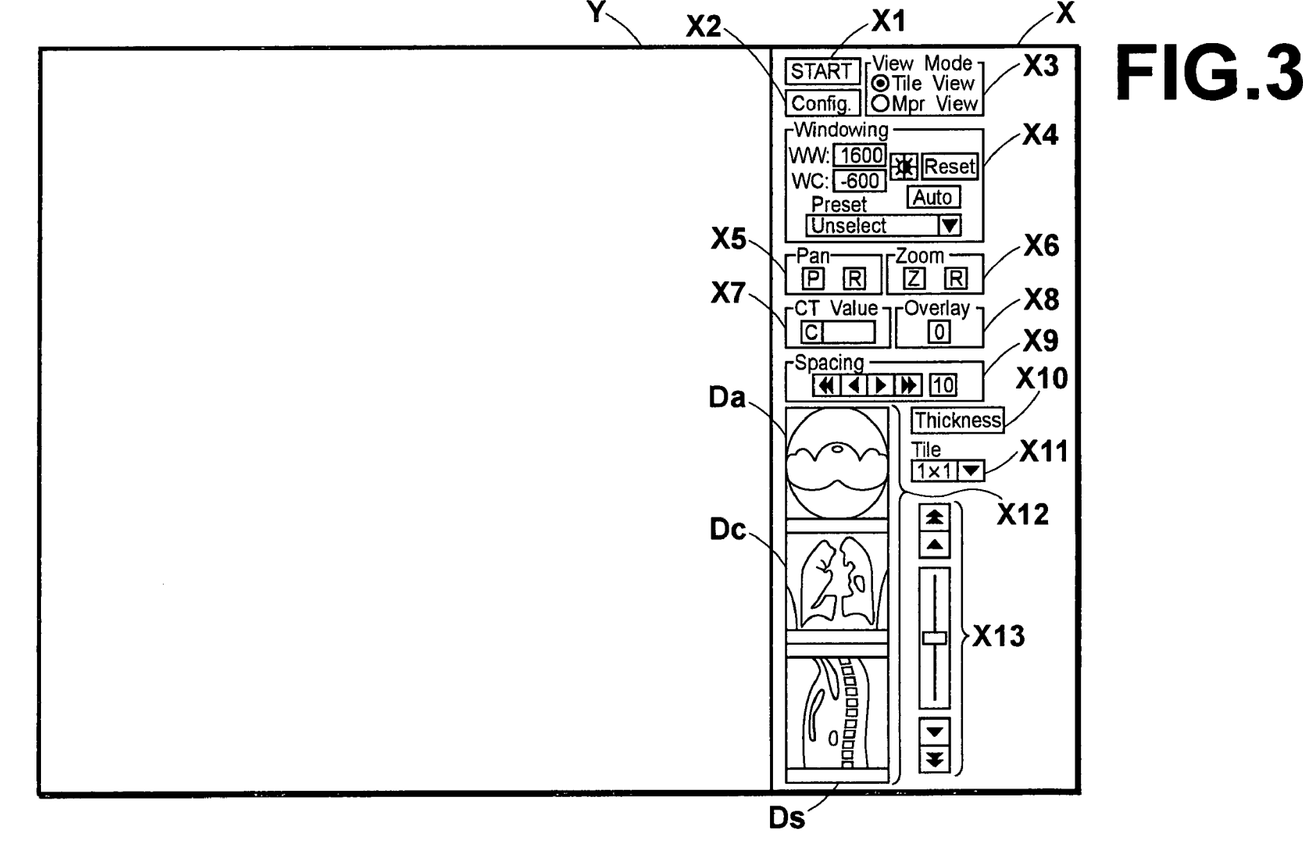
FIG. 3 is a view showing the screen of the image display system in the Tile View mode just after the image display system is started.

FIG. 3 shows the layout of the screen of the image display section 72 just after the image display system 1 is started. The control panel display area appears on the right side of the screen and is indicated at X and the cross-sectional image display area appear on the left side of the screen and is indicated at Y.

Functions of control buttons and the like in the control panel display area X will be described, hereinbelow.

"START" button X1 is for starting display of cross-section projected-images. When the START button X1 is pushed, cross-section projected-images are displayed in the cross-sectional image display area Y on the basis of three-dimensional data stored in the image data obtaining means 10 according to settings which have been registered in advance.

"Config." button X2 is for registering various settings. A setting display window is displayed in response to depression of the Config. button X2 and selection of the mode upon start-up of the image display system 1, presetting of gradation processing conditions and the like can be performed.

"View Mode" area X3 is for switching the view modes between the "Tile View" mode and the "Mpr View" mode.

"Windowing" area X4 is for setting gradation processing conditions. Gradation conditions can be selected from the dropdown menu in "Preset" in which a plurality of patterns of gradation processing conditions corresponding to preset combinations of the window value WC and the window width WW. When no gradation processing condition has been preset or no gradation processing condition has been selected, the default gradation processing conditions are applied. The set window width and window value are displayed like "WW:1600" and "WC:-600". When the gradation processing conditions are to be adjusted, a gradation setting button ⌘is pushed. When the gradation setting button ⌘is pushed, the window width WW and the window value WC become variable. When the mouse 92 is moved up and down and left and right with its click button depressed, the window width WW and the window value WC are continuously vary and the values of the window width WW and the window value WC are fixed at the values at the time when the mouse 92 is stopped and its click button is released. When the gradation setting button is pushed again, the window width WW and the window value WC become invariable. When "Reset" button is pushed, the window width WW and the window value WC are reset to the values corresponding to the gradation processing conditions set in "Preset". When no gradation processing condition is set in "Preset", the gradation processing conditions are reset to the default. When "Auto" button is depressed to turn on an automatic setting function, histogram analysis is automatically carried out on the pixel values of the image to be displayed and proper gradation processing conditions are constantly set on the basis of the analysis.

"Pan" area X5 is for decreasing the reduction ratio. While button P is kept depressed, the reduction ratio is kept decreased at a constant rate so that the image varies to cover larger area of the object. In response to depression of a button R, the reduction ratio is reset to the original value.

"Zoom" area X6 is for increasing the reduction ratio. While button Z is kept depressed, the reduction ratio is kept increased at a constant rate so that the image is gradually enlarged. In response to depression of a button R, the reduction ratio is reset to the original value.

"CT Value" area X7 is for recognizing the value of each pixel (CT value). When button C is depressed, the function of displaying the CT value is turned ON. The CT value of the pixel pointed by the pointer is displayed beside the C button. When button C is depressed again, the function of displaying the CT value is turned OFF.

"Overlay" area X8 is for selecting whether an additional line is to be displayed in the image. When button O is depressed, the function of displaying an additional line is turned ON, and additional lines such as centerline and/or a line indicating the cross section R are displayed. When button O is depressed again, the additional line displaying function is turned OFF and the additional lines disappear.

"Spacing" area X9 is displayed only in Tile View mode, and is for setting the space between cross-section projected-images when a plurality of cross-section projected-images continuous in the direction of an axis (A axis, C axis and S axis) are to be displayed. The space between cross-section projected-images can be changed by pushing an arrow button and the space between cross-section projected-images is shown beside the arrow buttons.

"Thickness" button X10 is for designating the depth T, and a selection screen is displayed in response to depression of Thickness button so that a desired depth can be selected from options in the selection screen. The depth T may be set by directly inputting a value or by moving a slider in place of selecting from the options.

"Tile" area X11 is displayed only in Tile View mode, and is for setting the number of images to be displayed in the cross-sectional image display area Y at one time. The number of images to be displayed in the cross-sectional image display area Y at one time is selected, for instance, from 1×1 (one), 2×2 (four), 3×3 (nine) and 4×4 (sixteen) though need not be limited to these values.

The typical image display area indicated at X12 is an area where typical three cross-sectional images respectively taken along cross sections perpendicular to the A axis, C axis and S axis and passing through the center of the object. When one of the three cross-sectional images is designated, continuous cross-section projected-images taken in the same direction as the designated cross-section image are displayed in the cross-sectional image display area Y in a number set in Tile area X11.

Slide bar X13 is for setting the region of the object to be displayed as a cross-section projected-image. When the slide bar is moved up and down, the region of the object to be displayed is shifted along the direction of axis of the designated cross section with the width in the direction of axis kept unchanged. The region currently displayed is shown by two lines (L1 and L2) representing the ends of the image in the three cross-sectional images displayed in the typical image display area X12. In place of using the slide bar X13, the region of the object to be displayed may be shifted by dragging the two lines representing the ends of the image in the three cross-sectional images displayed in the typical image display area X12 by the use of the mouse 92.

Figure 4:
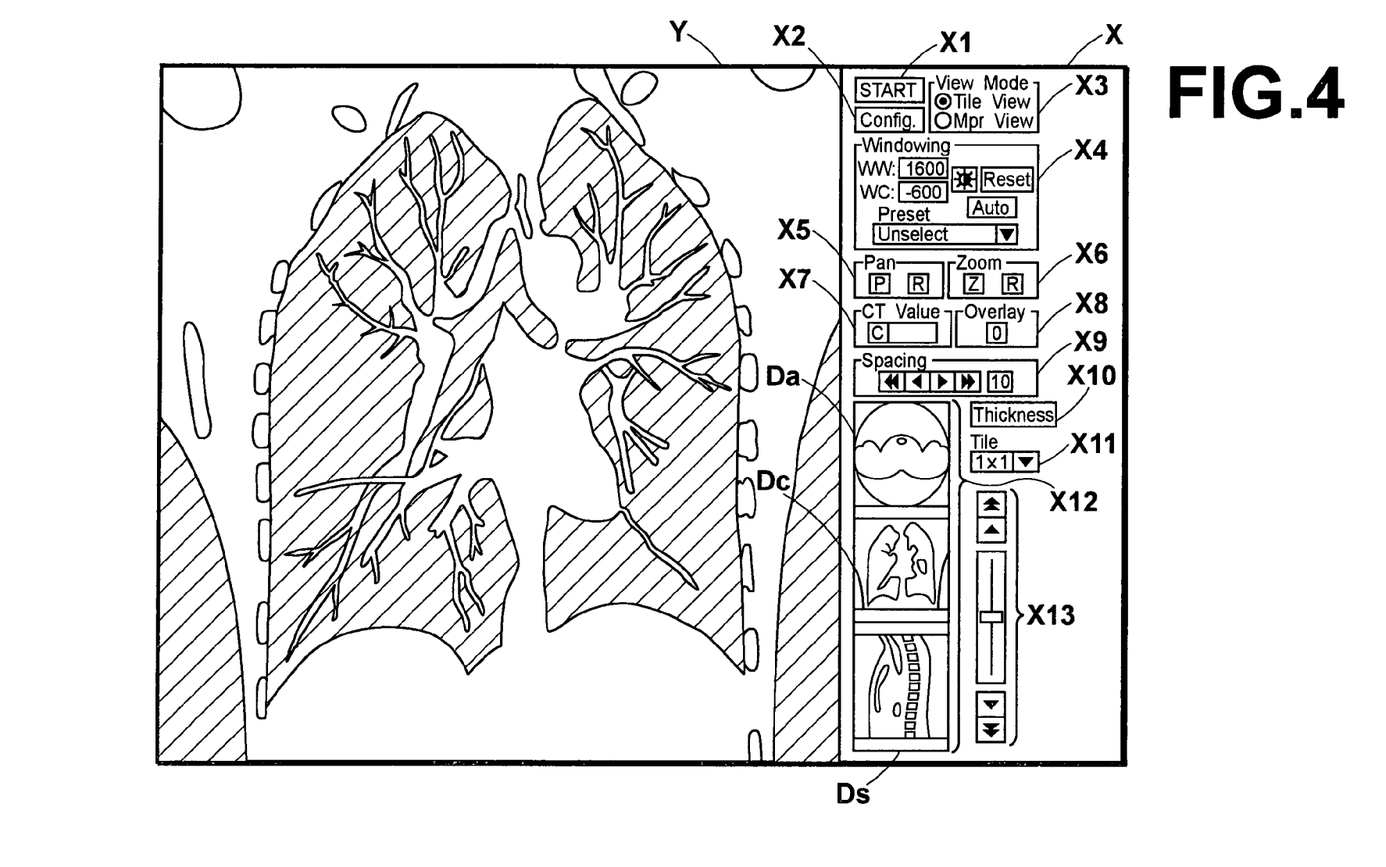
FIG. 4 is a view showing the screen of the image display system in the Tile View mode where one cross-section projected-image is displayed.

When the START button X1 is depressed after the image display system 1 is started, the cross-section projected-image data generating means 40 reads out necessary data from the image data obtaining means 40 according to the conditions set in the control panel display area X and generates cross-section projected-image data Pt representing a cross-section projected-image Pt to be displayed in Tile View mode. Here, it is assumed that the conditions have been set as follows. "Tile" X11=1×1, the typical image display area X12=Dc, the cross section R selected by the slide bar X13=a section including the center of the chest: default, the depth T selected in Thickness area X10=1 mm: default. Further it is assumed that the gradation condition automatic setting function has been turned on by "Auto" button in Windowing area X4 so that the image processing condition setting means 50 sets the image processing conditions on the basis of a histogram analysis of the CT values of the cross-section projected-image data P. For example, the image processing condition setting means 50 sets gradation conditions so that the image data P is converted so that the range of the CT values of an important part of the overall image corresponds to the dynamic range of gradation. The image processing means 60 obtains processed cross-section projected-image data P' by carrying out image processing on the cross-section projected-image data P on the basis of the image processing conditions set by the image processing condition setting means 50. The display control section 71 causes the image display section 72 to display a cross-section projected-image P' (i.e., a cross-section projected-image of the chest as seen from front) in the cross-sectional image display area Y on the screen thereof on the basis of the processed cross-section projected-image data P'.

Figure 5:
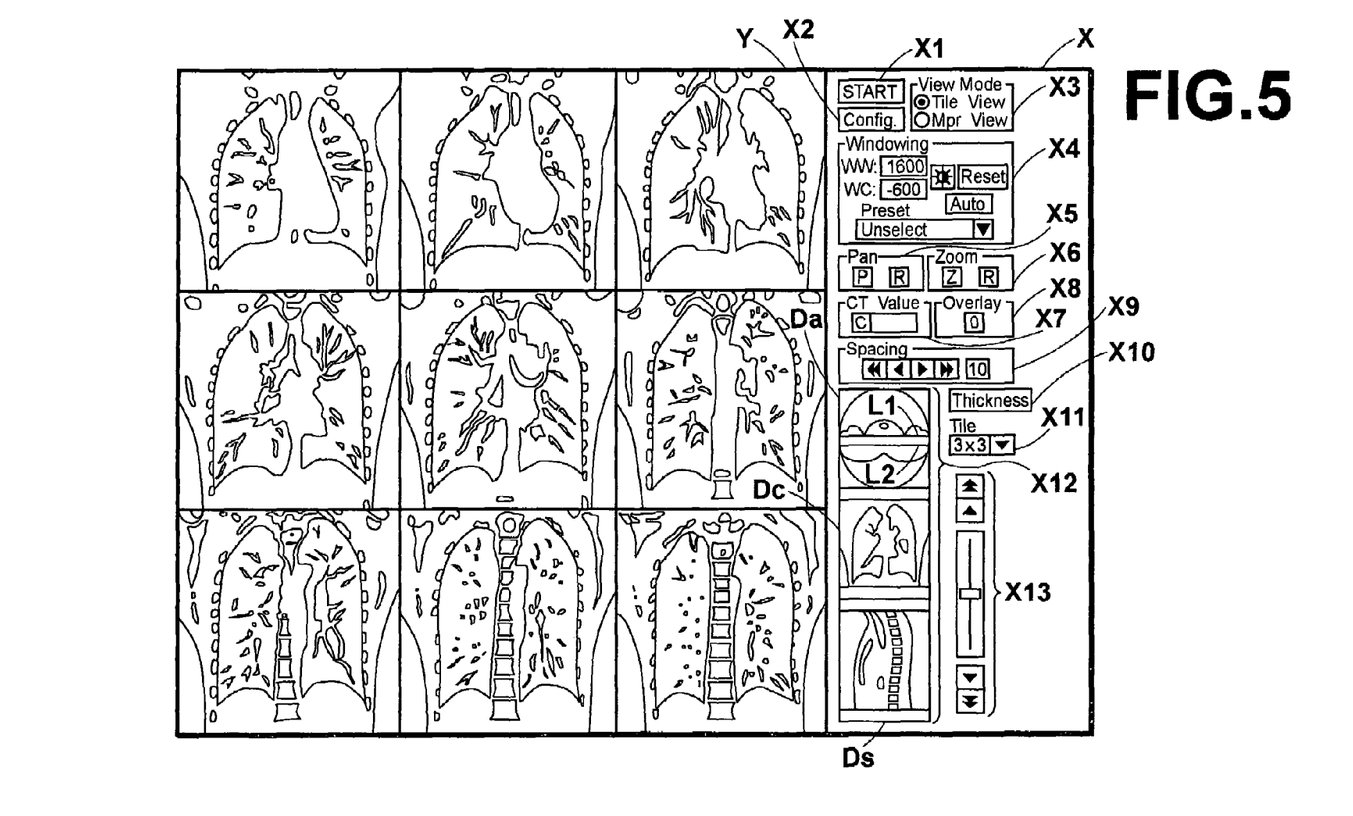
FIG. 5 is a view showing the screen of the image display system in the Tile View mode where nine cross-section projected-images are displayed.

If "Tile" is changed to 3×3, nine cross-section projected-images are displayed at spaces set in "Spacing". These images reflect all the conditions set in the control panel display area X.

FIG. 5 is a view showing the screen of the image display system in the Tile View mode where nine cross-section projected-images P' are displayed.

Figure 6:
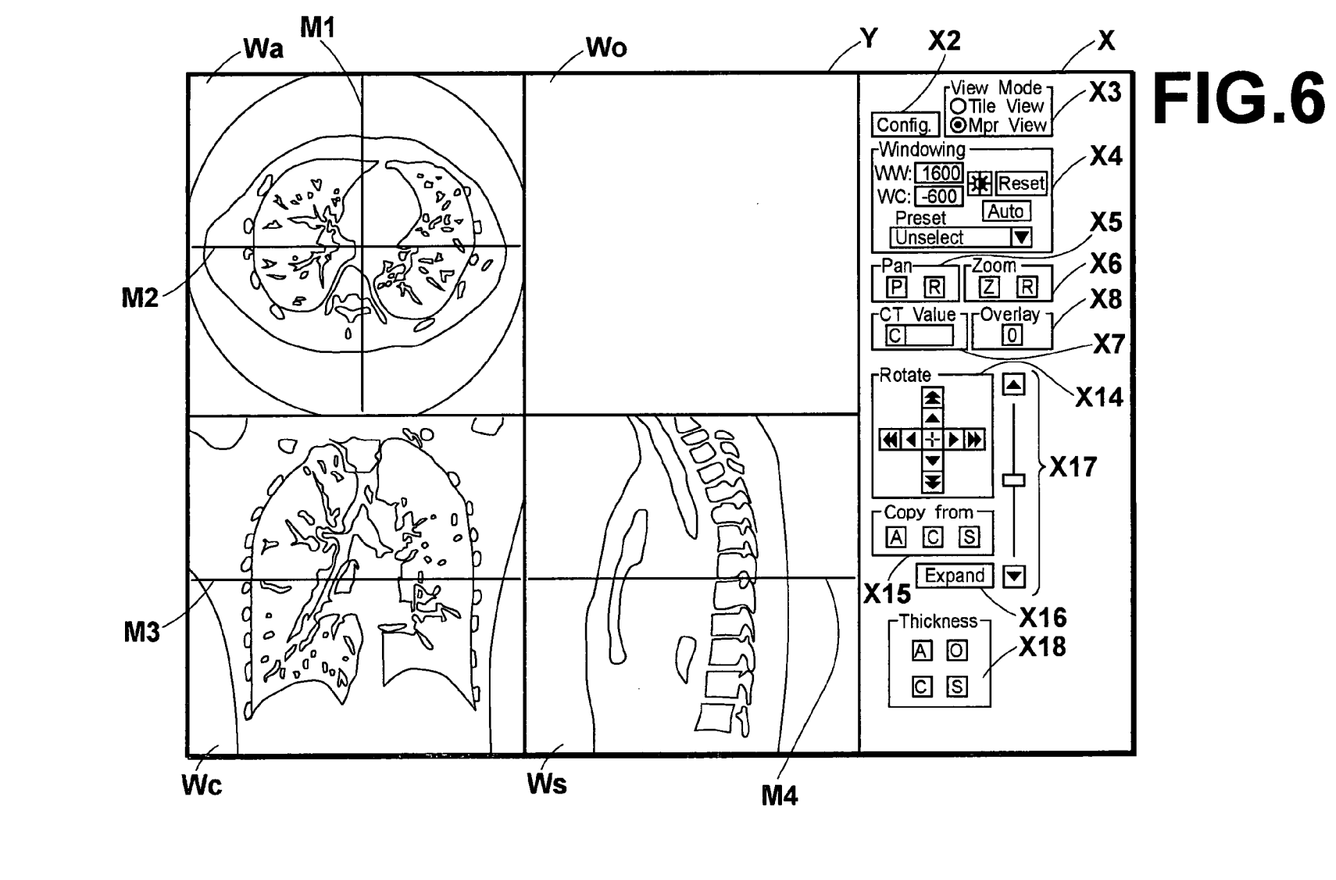
FIG. 6 is a view showing the screen of the image display system when the view mode is switched to the Mpr View mode.

When the view mode is switched to the "Mpr View" mode, four windows are displayed at one time in the cross-sectional image display area Y, and control sections different from X10 to X13 shown in FIG. 3 are displayed in the control panel display area X.

FIG. 6 is a view showing the screen of the image display system 1 when the view mode is switched to the Mpr View mode. In the upper left window Wa, a cross-section projected-image Pa as seen from below taken along a section perpendicular to A-axis is displayed, in the lower left window Wc, a cross-section projected-image Pc as seen from front taken along a section perpendicular to C-axis is displayed, in the lower right window Ws, a cross-section projected-image Ps as seen from left taken along a section perpendicular to S-axis is displayed, and in the upper right window Wo, a cross-section projected-image Po taken along an arbitrary section is displayed.

Also in the Mpr View mode, a series of processing, necessary data is read out from image data obtaining means 40 and cross-section projected-image data P is generated by the cross-section projected-image data generating means 50, image processing conditions are set by the image processing condition setting means 50 on the basis of a histogram analysis of the CT values of the cross-section projected-image data P, processed cross-section projected-image data P' is obtained by carrying out image processing on the cross-section projected-image data P on the basis of the image processing conditions set by the image processing condition setting means 50 and a cross-section projected-image P' is displayed on the screen of the image display section 72 are executed upon designation of the cross section R and the depth T as in the Tile View mode.

Immediately after the view mode is switched, cross-section projected-images respectively taken along cross sections perpendicular to the axes and passing through the center of the object are displayed in windows Wa, Wc and Ws, and an image which has been viewed in the Tile View mode is displayed in the window Wo. In order for a cross-section projected-image Po taken along an arbitrary section to be displayed, the Section Ro is designated by copying one of the cross-section projected-images Pa, Pc and Ps (These cross-section projected-images will be referred to as "three-axes cross-section projected-images", hereinbelow.) displayed in the windows Wa, Wc and Ws to the window Wo, rotating the copied image about one of A-axis, C-axis and S-axis, thereby determining the axis perpendicular to the section Ro of the copied image, and moving the section Ro of the copied image along the axis, and designating the depth To.

Function of the different control button and the like in the control panel display area X will be described, hereinbelow.

"Copy From" area X15 is for copying one of the three-axes cross-section projected-images and when one of "A", "C" and "S" button is depressed, the cross-section projected-image displayed in the corresponding one of the windows Pa, Pc and Ps is copied to the window Wo. Copy of the image can also be executed by dragging a desired image and dropping it in the window Wo.

"Rotate" area X14 is for rotating the section Ro of the cross-section projected-image Po displayed in the window Wo about one of the A-axis, C-axis and S-axis, and when one of the arrow buttons is depressed, the section Ro of the cross-section projected-image Po is rotated toward the depressed arrow button. Rotation of the section Ro can also be executed by dragging a line (to be described later) displayed in each of the three-axes cross-section projected-images to represent the position of the section to rotate the line by the mouse 92.

Slide Bar X17 is for moving the section of the selected cross-section projected-images of those displayed in the respective windows in the direction of axis perpendicular to the section. By moving Slide Bar X17, the section is moved and the image displayed changes. By depressing arrows on the upper and lower sides of Slide Bar X17, the section also can be moved. The cross-section projected-image can be selected by clicking the cross-section projected-image with the mouse 92. The outer edge of the selected cross-section projected-image is colored in a remarkable color such as red.

"Expand" button X16 is for enlarging the cross-section projected-image Po displayed in the window Wo. When Expand button X16 is depressed, the cross-section projected-image Po displayed in the window Wo is displayed in an enlarged scale over the entire area of the cross-sectional image display area Y.

"Thickness" area X18 is for designating the depth T of the respective cross-section projected-images displayed in the windows Wa, Wc, Ws and Wo. When one of "A", "C", "S" and "O" buttons are depressed, the depth T of the corresponding cross-section projected-image Pa, Pc, Ps or Po can be designated.

Figure 7:
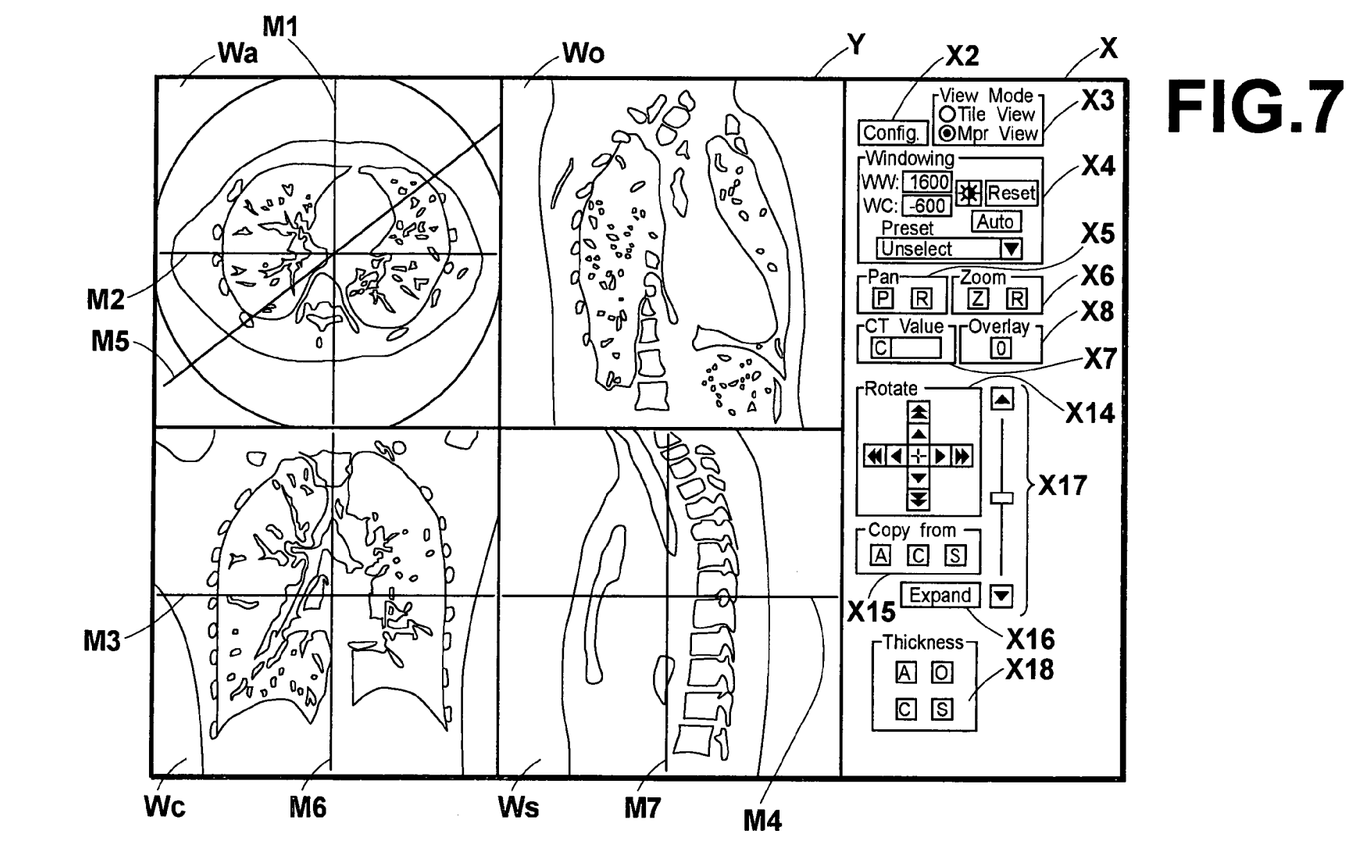
FIG. 7 is a view showing the screen of the image display system where a cross-section projected-image as seen from an intermediate position between the front and the right side of the object is displayed in the window Wo.

An example of control for displaying a cross-section projected-image Po along an arbitrary section will be described, hereinbelow, in conjunction with a case where a cross-section projected-image as seen from an intermediate position between the front and the right side of the object is displayed as the cross-section projected-image Po.

One of the three axes cross-section projected-images which is the most suitable for designating a desired section is copied to the window Wo. It is assumed here that the most suitable one of the three axes cross-section projected-images is the cross-section projected-image Pc displayed in the window Wc. "C" button in the Copy From area X15 is depressed to copy the cross-section projected-image Pc to the window Wo. Then the leftward arrow button in the Rotate area X14 is repeatedly depressed to rotate the section Ro about A-axis in the counterclockwise direction as seen from below to a desired angle. Thereafter, the section Ro is moved along the axis perpendicular to the section Ro to a desired position by sliding the slide bar X17 or by depressing one of the arrow buttons associated with the slide bar X17. The depth To is designated by depressing O button in Thickness area and selecting a desired depth.

Figure 8:
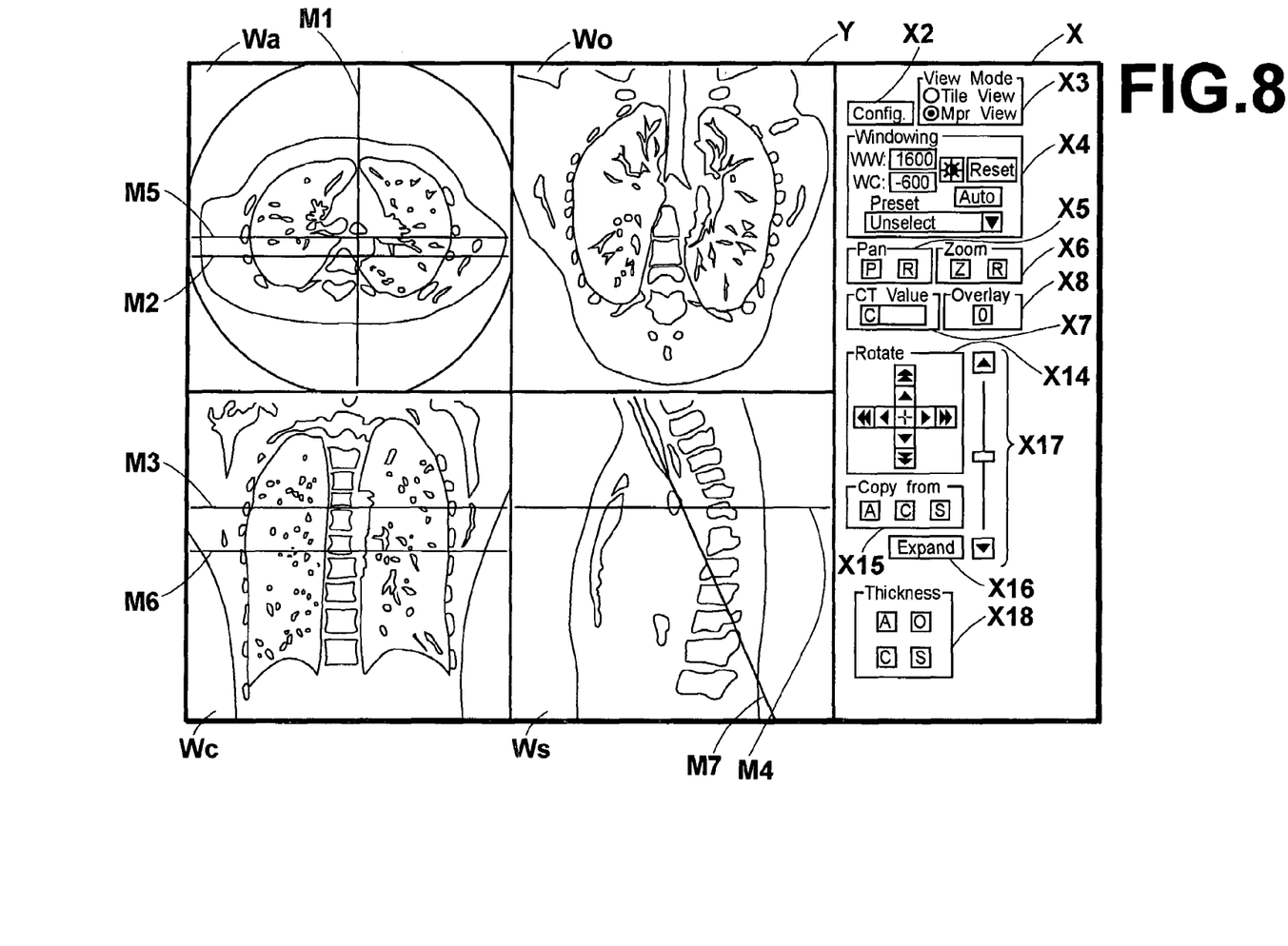
FIG. 8 is a view showing the screen of the image display system where a cross-section projected-image as seen from an intermediate position between the front and the bottom of the object is displayed in the window Wo.

FIG. 7 is a view showing the screen of the image display system where a cross-section projected-image Po as seen from an intermediate position between the front and the right side of the object is displayed in the window Wo, and FIG. 8 is a view showing the screen of the image display system where a cross-section projected-image Po as seen from an intermediate position between the front and the bottom of the object is displayed in the window Wo. The section Ro may be rotated about a plurality of axes without limited to only one axis.

Where the section of each of the cross-section projected-images is positioned in the three-dimensional space is shown by lines displayed in the respective images. That is, lines M1 to M4 displayed in the cross-section projected-images Pa, Pc and Ps mutually show the positions of sections Ra, Rc and Rs in the cross-section projected-images Pa, Pc and Ps. That is, the line Ml is an intersection of the section Ra and the section Rs, the line M2 is an intersection of the section Ra and the section Rc, the line M3 is an intersection of the section Rc and the section Ra, and the line M4 is an intersection of the section Rs and the section Ra. Further, lines M5 to M7 displayed in the cross-section projected-images Pa, Pc and Ps show the position of section Ro in the cross-section projected-images Po. That is, the line M5 is an intersection of the section Ra and the section Ro, the line M6 is an intersection of the section Rc and the section Ro and the line M7 is an intersection of the section Rs and the section Ro. Otherwise the position of the section may be displayed in a solid model figure of the object displayed beside the cross-section projected-image.

The view mode can be switched from the Tile View mode to the Mpr View mode in various methods other than designating the view mode in the View Mode area. For example, when there is an interested image in the cross-section projected-images displayed in the Tile View mode, the view mode is switched to the Mpr View mode, for instance, by double-clicking the mouse 92 on a point on the interested image and cross-section projected-images where said three axes pass through the point are displayed in the windows Wa, Wc and Ws.

Various settings may be arranged to be reflected upon switching of the view mode, to be able to be set independently, or to be able to select by items whether the setting is to be reflected. It is possible to arrange the settings to be stored in a plurality of patterns so that the patterns may be switched as desired. Further, it is possible to arrange the settings to be stored so that work can be smoothly continued when the view mode is returned to the original view mode.

As can be understood from the description above, in the image display system 1 of this embodiment, since image data V consisting of three-dimensional pixel values representing an object is obtained, an arbitrary cross section R of the object and a depth T perpendicular to the cross section R are designated, cross-section projected-image data P representing a cross-section projected-image obtained by projecting, onto a plane parallel to the designated cross section, averages of the pixel values arranged in the directions of depth in the region defined by the designated cross section and the designated depth including the designated cross section is generated on the basis of the obtained image data V, image processing conditions are set on the basis of analysis of the generated cross-section projected-image data P, image processing is carried out on the cross-section projected-image data P on the basis of the image processing conditions set to obtain processed cross-section projected-image data P', and an image is displayed on the basis of the processed cross-section projected-image data P', an observable image is displayed in response to switching of the cross section R and/or the depth T and troublesome operations by the user including setting of the image processing conditions and image processing become unnecessary, whereby efficient observation of images can be realized.

Though, in the image display system 1 of this embodiment, the image processing condition setting means 50 sets image processing conditions on the basis of "analysis of the cross-section projected-image data P", the image processing condition setting means may set image processing conditions on the basis of the "depth designated by the depth designating means 20". Generally, the image density tends to be leveled and the image tends to be lower in contrast as the depth increases. Accordingly, it is preferred that the image processing conditions be changed even if only the depth is changed. For example, the image processing conditions (gradation processing conditions) are set so that the width of the range of the CT values allotted to the dynamic range of gradation is gradually narrowed about the average of the CT values as the depth increases.

Also in the case where image processing conditions are set on the basis of the "depth designated by the depth designating means 20", an observable image is displayed in response to switching of the depth T and troublesome operations by the user including setting of the image processing conditions and image processing become unnecessary, whereby efficient observation of images can be realized, as in the case where image processing conditions are set on the basis of "analysis of the cross-section projected-image data P".

Further, the image processing by the image processing means 50 need not be limited to gradation processing or frequency processing described above. For example, the pixels whose CT values exceed a predetermined threshold value may be displayed in a different color or different colors according to the CT values.

Though, in the embodiment described above, cross-section projected-image data P is generated by projecting, onto a plane parallel to the designated cross section, averages of the pixel values arranged in the directions of depth in the region defined by the designated cross section and the designated depth including the designated cross section, values other than the simple averages of the pixel values arranged in the directions of depth may be used. For example, weighted averages weighted according to the pixel values, or medians maybe used. Further, even a maximum value (MIP) or a minimum value (MinIP) may be used.

Further, the image processing condition setting means 50 may set the image processing conditions taking into account the kind of the object, the purpose of observation and/or the like input through the input means 90 in addition to the depth or the analysis of the cross-section projected-image data. For example, when the kind of the object is a human chest, the difference in the pixel value between the lung and the mediastinum is generally large and the image of the chest tends to be high in contrast. In such a case, gradation processing conditions are set so that an image relatively low in contrast is obtained. Whereas when the purpose of observation is to measure the cardiothoracic ratio, the image processing conditions may be gradation processing conditions which enhances high-frequency components so that edges of the heart and the thorax are clearly displayed. With such an arrangement, more proper image processing conditions can be set according to the feature in density which differs from object to object and/or the purpose of observation, whereby more observable image can be displayed.

What is claimed is:

1. An image display system comprising
an image data obtaining means which obtains image data consisting of three-dimensional pixel values representing an object,
a cross section designating means for designating an arbitrary cross section of the object,
a depth designating means for designating a depth perpendicular to the designated cross section,
a cross-section projected-image data generating means which generates, on the basis of the image data, cross-section projected-image data representing a cross-section projected-image obtained by projecting, onto a plane parallel to the designated cross section, averages of the pixel values arranged in the directions of depth in the region defined by the designated cross section and the designated depth including the designated cross section,
an image processing condition setting means which sets image processing conditions on the basis of the designated depth,
an image processing means which carries out image processing on the cross-section projected-image data on the basis of the image processing conditions set by the image processing condition setting means, and
a display means which displays an image on the basis of the cross-section projected-image data processed by the image processing means.

2. An image display system as defined in claim 1 in which said image processing condition setting means sets the image processing conditions on the basis of the kind of the object represented by the image data.

3. An image display system as defined in claim 2 in which said image processing condition setting means sets the image processing conditions also on the basis of the purpose of observation of the cross-section projected-image.

4. An image display system as defined in claim 3 in which the image data is three-dimensional CT data.

5. An image display system as defined in claim 2 in which the image data is three-dimensional CT data.

6. An image display system as defined in claim 1 in which said image processing condition setting means sets the image processing conditions on the basis of the purpose observation of the cross-section projected-image.

7. An image display system as defined in claim 6 in which the image data is thee-dimensional CT data.

8. An image display system as defined in claim 1 in which the image data is three-dimensional CT data.

9. An image display system as defined in claim 1 in which the image data represents a medical image.

10. An image display system as defined in claim 1 in which the image processing includes at least one of gradation processing for adjusting the density level or contrast of the image and frequency processing for enhancing components in a particular frequency band.

11. An image display system comprising
an image data obtaining means which obtains image data consisting of three-dimensional pixel values representing an object,
a cross section designating means for designating an arbitrary cross section of the object,
a depth designating means for designating a depth perpendicular to the designated cross section,
a cross-section projected-image data generating means which generates, on the basis of the image data, cross-section projected-image data representing a cross-section projected-image obtained by projecting, onto a plane parallel to the designated cross section, averages of the pixel values arranged in the directions of depth in the region defined by the designated cross section and the designated depth including the designated cross section,
an image processing condition setting means which sets image processing conditions on the basis of analysis of the cross-section projected-image data,
an image processing means which carries out image processing on the cross-section projected-image data on the basis of the image processing conditions set by the image processing condition setting means, and
a display means which displays an image on the basis of the cross-section projected-image data processed by the image processing means.

12. An image display system as defined in claim 11 in which said image processing condition setting means sets the image processing conditions on the basis of the kind of the object represented by the image data.

13. An image display system as defined in claim 12 in which said image processing condition setting means sets the image processing conditions also on the basis of the purpose of observation of the cross-section projected-image.

14. An image display system as defined in claim 13 in which the image data is three-dimensional CT data.

15. An image display system as defined in claim 12 in which the image data is three-dimensional CT data.

16. An image display system as defined in claim 11 in which said image processing condition setting means sets the image processing conditions on the basis of the purpose of observation of the cross-section projected-image.

17. An image display system as defined in claim 16 in which the image data is three-dimensional CT data.

18. An image display system as defined in claim 11 in which the image data is three-dimensional CT data.

19. An image display system as defined in claim 11 in which the image data represents a medical image.

20. An image display system as defined in claim 11 in which the image processing includes at least one of gradation processing for adjusting the density level or contrast of the image and frequency processing for enhancing components in a particular frequency band.

21. An image display system of claim 1, wherein the processing includes at least one of frequency processing with differently weighted edges and histogram analysis of pixel values in the cross-section projection image data.

22. An image display system of claim 21, wherein the image condition processing means sets the image processing conditions on the basis of the cross-section projected-image obtained by projecting.

23. An image display system of claim 1, wherein the cross-section projected-image data generating means obtains data of multiple planes parallel to the designated cross section, and from the data of the multiple planes, determines the averages of the pixels values arranged in the directions of depth, said averages corresponding to adjacent values in the depth direction.

* * * * *